United States Patent Office 3,500,792
Patented Mar. 17, 1970

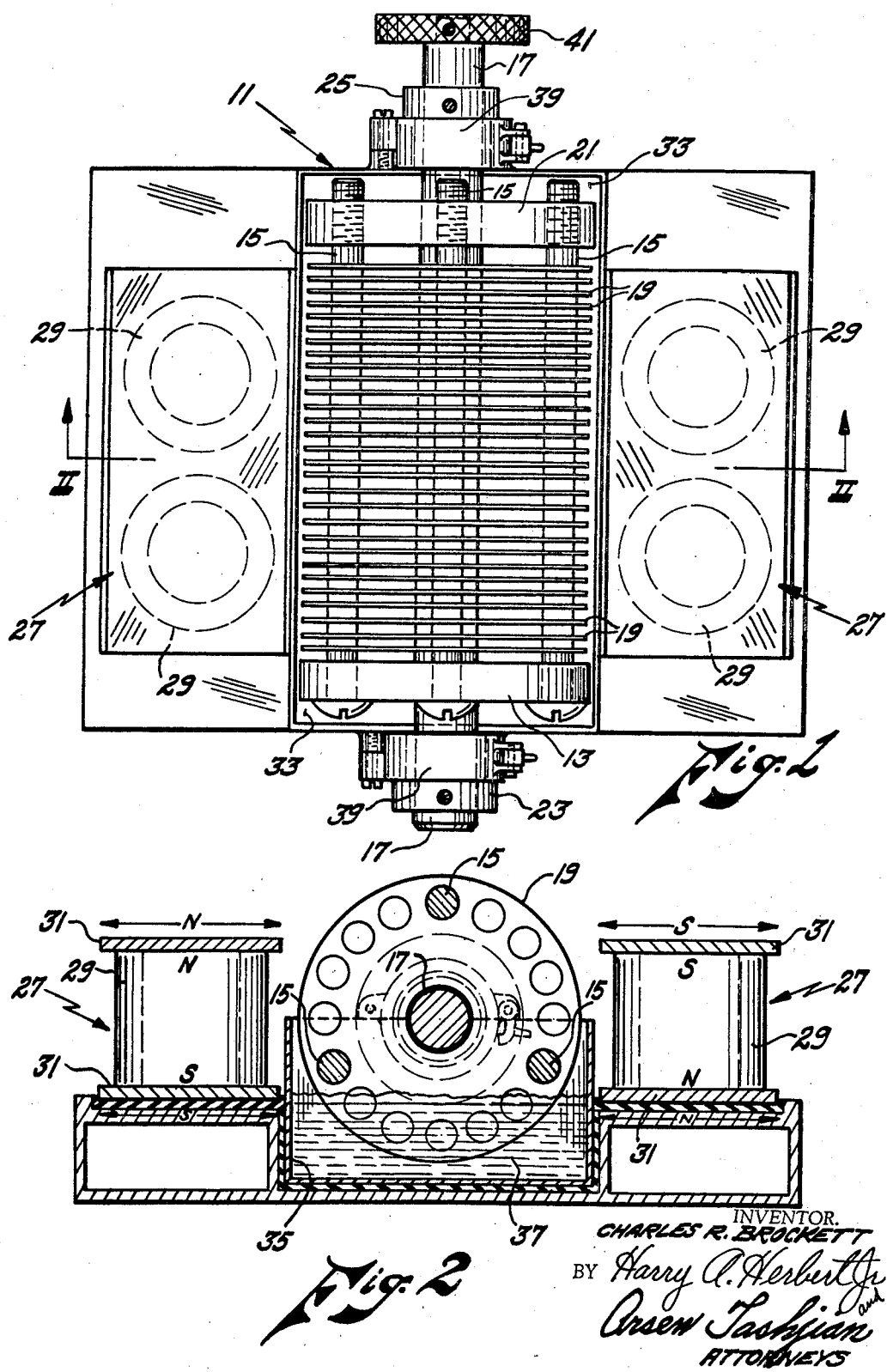

---

3,500,792
MAGNETIC SEPARATING AND COATING APPARATUS
Charles R. Brockett, Rowland Heights, Calif., assignor to the United States of America as represented by the Secretary of the Air Force
Filed Apr. 29, 1968, Ser. No. 725,046
Int. Cl. B05c 3/09
U.S. Cl. 118—416    3 Claims

ABSTRACT OF THE DISCLOSURE

Apparatus for magnetically holding and separating laminations used in electric motors to allow coating of all surfaces with insulating adhesive. The laminations are stacked on a holding fixture positioned in the magnetic field between magnetic separators which arrangement causes the laminations to come to rest in an evenly spaced parallel relationship. The laminations are then rotated through a container of adhesive, compressed and cured to form the insulated lamination stack.

BACKGROUND OF THE INVENTION

This invention relates to apparatus for forming insulated stacks used in electric motors, transformers, and the like, and, more particularly, the invention is concerned with providing an apparatus which automatically holds a series of laminations in evenly spaced relationship so that they can be completely coated on all surfaces prior to compressing and curing.

Heretofore, the insulated stacks which are used in electric motors to accommodate the windings are formed by either brushing adhesive on each lamination by hand or by putting each lamination through a coated roller by hand. The coated laminations are then placed on a fixture by hand and compressed and cured. It can be seen that all of the handling required while carrying out these last-named procedures increases the possibility of bending and contamination of the laminations as well as adding to the chance of uncoated spots on the surfaces. Thus, the inefficient and time-consuming method presently in use produces a product which is potentially inferior and less dependable and consistent than the automatically produced stacks using the apparatus hereinafter disclosed.

SUMMARY OF THE INVENTION

The present invention is primarily concerned with a system for efficiently mass producing insulated stacks for electric motors. In the practice of the invention, a stack of laminations is placed on a holding fixture which is placed between magnetic separators and subjected to the influence thereof. The laminations become evenly separated because the plates of the magnetic separators polarize each lamination identically. Since the polarity is the same in each lamination, and the laminations are not free to rotate, they must by the law of repulsion of like polarities, translate in a direction normal to their surface until the force on each lamination is balanced. This condition exists when the laminations are parallel and evenly spaced.

To complete the formation of the insulated stacks, the laminations are then rotated through a pan or container of insulating adhesive, compressed and cured. The holding fixture also serves as a curing mold during the formation of the integral stack of individually insulated laminations.

Accordingly, it is an object of the invention to provide apparatus to hold and magnetically separate laminations used in electric motors and the like while being coated with insulating adhesive.

Another object of the invention is to provide a holding fixture on which a stack of laminations can be placed and be magnetically separated into evenly spaced parallel relationship for coating and curing to form an integral stack of individually insulated laminations.

Still another object of the invention is to provide magnetic separators for influencing the laminations stacked on a holding fixture by polarizing each lamination identically causing them to become evenly separated and holding each lamination in position by means of a balanced force produced as a result of the law of repulsion of like polarities.

A further object of the invention is to provide an automatic apparatus for coating a series of laminations without manual handling of the individual laminations during the coating process.

A still further object of the invention is to provide a lamination coating apparatus wherein the direct labor time required for forming a stack is substantially less than that required by commonly used hand methods.

Another further object of the invention is to provide a lamination coating and curing apparatus which is far less expensive and elaborate than the presently known and used equipment which is required for automating the lengthy hand method.

These and other objects, features and advantages will become more apparent after considering the description that follows and from the drawings wherein like numbers are used throughout to identify like elements in the two views.

DESCRIPTION OF THE DRAWINGS

In the drawings:

FIGURE 1 is a top plan view of the apparatus according to the invention showing the laminations held in evenly spaced relationship by the influence of the magnetic separators; and FIGURE 2 is a cross-sectional view taken along the line II—II of FIGURE 1 showing the spaced laminations immersed in the insulating adhesive ready to be rotated and coated prior to compressing and curing to form the stack.

PREFERRED EMBODIMENT OF THE INVENTION

Although the utilization of the present invention is directed toward its use in the preparation of stacks of laminations for use in electric motors, it should be understood that equally effective use of the invention can be made during the manufacture of transformers and the like. As a matter of fact the invention is particularly useful in any situation where it is necessary or desirable to maintain a plurality of magnetizable pieces of sheet material in evenly spaced relationship to each other in order to coat or otherwise treat the surfaces thereof.

Referring now to FIGURE 1, there is shown detail view of the magnetic separating apparatus according to the invention. The apparatus includes a holding assembly 11 having a base plate 13 through which three supporting pins 15 are passed and extended outwardly therefrom. A central shaft 17 passes through the center of the base plate 13 and serves as an axle around which the plate 13 can rotate. A series of laminations 19 having a plurality of circular openings between their inner and outer periphery, are positioned over the suporting pins 19 so that the pins 19 pass through certain of the openings in the laminations 19 to form an aligned stack of spaced elements. A back-up plate 21 similar to the base plate 13 is positioned at the other end of the supporting pins 13 and serves to retain them in angular alignment while being supported by the other end of the central shaft 17. The collars 23 and 25 are attached to the central shaft 17 to prevent endwise movement of the assembly 11.

The assembly 11, including the laminations 19 in position on the pins 15, is then positioned between magnetic separators 27 each of which include preferably a vertically oriented hollow cylinder alnico magnet 29 having north and south poles. Ferromagnetic plates 31 are disposed over each end of the alnico magnets 29. The plates 31 take the magnetic polarity of the end of the magnet 29 with which they are in contact. As shown in FIGURE 2, the magnets 29 on either side of the assembly 11 are oriented so that the plates 31, which are correspondingly positioned on opposite sides thereof, are of opposite polarities to create a magnetic field therebetween. The laminations 19 are influenced by being in close proximity to the plates 31 and since each of the laminations 19 are identically polarized by the magnetic separators 27, they separate and come to rest in evenly spaced parallel relationship. This condition results because the laminations as held by the supporting pins 15 are not free to rotate and, therefore, are governed by the law of repulsion of like polarities which is translated in a direction normal to their surface until the force on each side of each lamination 19 is balanced. When this condition exists, the laminations 19 are parallel and evenly spaced.

A container 33 in the form of a relatively shallow pan is fabricated of walls 35 of non-magnetic material which do not appreciably affect the magnetic field. An insulating adhesive material 37 in liquid form is placed in the container 33 to a level so that a portion of the laminations 19 are totally immersed in the material 37 when the assembly is in operating position. The bearing caps 39 serve to assist in the rotation of the holding assembly when it is slowly rotated by using the handle 41.

MODE OF OPERATION

The hereinbefore described magnetically operated separating and coating apparatus provides a simple and efficient solution to the problem of the production coating of stacks used in motors and transformers. The invention utilizes known components to provide a mass productiton capability to the manufacture of electrical articles and is more simple and less costly while, at the same time, producing a more dependable end product.

In operation, the laminations 19 are positioned on the supporting pins 15, consecutively, one after the other. The back-up plate 21 is then attached forming the holding assembly 11 which is positioned between the magnetic sceparators 27 and in the container 33. The ferromagnetic plates 31, magnetized by the magnets 29, serve to polarize each lamination identically. Since the polarity is the same in each lamination 19, and the laminations 19 are not free to rotate, they must by the law of repulsion of like polarities, translate in a direction normal to their surfaces until the force on each lamination 19 is balanced.

The stack of laminations 19, positioned in the holding fixture and separated under the influence of the magnetic separators 27, come to rest in an evenly spaced parallel relationship. An insulating adhesive 37 is added to the container 33 to a level as shown in FIGURE 2. The assembly 11 is then slowly rotated through the liquid adhesive 37 for at least one revolution thereby completely coating all surfaces of each lamination 19. After coating, the stack of laminations is compressed and cured in the conventional manner with the holding fixture serving as a curing mold. After curing, the stack is removed from the holding fixture allowing the supporting pin holes to be used to accommodate motor windings or fastening means as required. Other holes or notches (as shown) may be available for utilization as support means for windings or fastenings.

In considering the distinctive features of the magnetic separating means hereinbefore described, it can be seen that a simple and substantially foolproof apparatus has been provided. The holding assembly is versatile and can be easily modified to hold laminations of various sizes and shapes in any desired number. The inventive apparatus operates equally well regardless of the configuration of the laminations and the type of liquid to be coated thereon. All of these advantages are evident and, at the same time, a superior and more dependable end product in a much shorter time at a lower labor cost, is produced.

Although the invention has been illustrated in the accompanying drawings and described in the foregoing specification in terms of a preferred embodiment thereof, the invention is not limited to this embodiment or to the particular uses mentioned. It will be apparent to those skilled in the art that my invention can be used for separating and coating any of a variety of articles of magnetic sheet material. Also, it should be understood that various changes, alterations, modifications and substitutions, particularly with respect to construction details, can be made in the arrangement of the several elements.

Having thus described my invention what I claim and desire to secure by Letters Patent of the United States is:

1. Magnetic separating and coating apparatus for maintaining a series of laminations in evenly spaced parallel relationship while applying a coating thereto, said apparatus comprising a holder on which the laminations are stacked, said holder preventing the free rotation of said laminatitons relative thereto, magnetic separators positioned on each side of said holder for creating a magnetic field therearound, and a container for holding a quantity of liquid therein, said container being dimensioned to accommodate said holder with the evenly spaced laminations stacked thereon, said holder being positioned over said container such that a portion of the laminations are totally immersed in the liquid causing them to become coated when said holder is rotated through the liquid in the container.

2. The magnetic separating and coating apparatus defined in claim 1 wherein the holder on which the laminations are stacked includes a base plate, a plurality of supporting pins extending outwardly from said base plate, said laminations being stacked on said pins, a back-up plate on the other end of said holder, said supporting pins terminating at said back-up plate, and a central shaft extending through said holder for allowing rotation thereof.

3. The magnetic separating and coating apparatus defined in claim 1 wherein said magnetic separators positioned on each side of said holder include hollow cylinder alnico magnets, said magnets being vertically oriented, a ferromagnetic plate disposed on each end of each of said magnets, the magnetic separators located on one side of said holder being of opposite polarity to the magnetic separator on the other side of said holder, thereby creating a magnetic field which produces like polarities in each of the individual laminations causing the forces thereon to be balanced and the laminations coming to rest in an evenly spaced parallel relationship.

References Cited

UNITED STATES PATENTS 2,385,653  9/1945  Rockola _____ 117—43

WALTER A. SCHEEL, Primary Examiner

JOHN P. McINTOSH, Assistant Examiner

U.S. Cl. X.R.

118—500